United States Patent
Wöll et al.

(10) Patent No.: US 6,276,100 B1
(45) Date of Patent: Aug. 21, 2001

(54) BULLETPROOF GLASS WINDOW FOR USE AS A WINDSCREEN IN A MOTOR VEHICLE

(75) Inventors: Herwig Wöll, Sachsenheim; Siegfried Stranner, München, both of (DE)

(73) Assignee: Isoclima GmbH, Munich (DE)

(*) Notice: Subject to any disclaimer, the term of this patent is extended or adjusted under 35 U.S.C. 154(b) by 0 days.

(21) Appl. No.: 09/448,764

(22) Filed: Nov. 24, 1999

(30) Foreign Application Priority Data

Nov. 27, 1998 (DE) .......................................... 298 18 858 U

(51) Int. Cl.[7] .................................................... E06B 3/964
(52) U.S. Cl. ........................ 52/204.62; 428/430; 216/34; 296/93
(58) Field of Search ............................. 216/34; 296/93; 428/430; 52/786.1, 786.11, 786.12

(56) References Cited

U.S. PATENT DOCUMENTS

| | | |
|---|---|---|
| 3,155,422 | * 11/1964 | Campbell et al. . |
| 4,228,425 | * 10/1980 | Cooke ................................. 340/550 |
| 4,817,347 | 4/1989 | Hand et al. . |
| 4,824,722 | * 4/1989 | Jarrett .................................. 428/430 |
| 5,456,372 | * 10/1995 | Solinov et al. ......................... 216/34 |

FOREIGN PATENT DOCUMENTS

WO97/07377    2/1997 (WO).

* cited by examiner

*Primary Examiner*—Carl D. Friedman
*Assistant Examiner*—Steve Varner
(74) *Attorney, Agent, or Firm*—Lowe Hauptman Gilman & Berner, LLP

(57) ABSTRACT

The present invention relates to a bulletproof glass window, in particular for use as a windscreen of a motor vehicle, fitted into a frame (9), the bulletproof glass window comprising several laminated glass panes (1,2) in a compound, of which at least one glass pane (1) juts out above the other glass pane(s) (2) with a projecting section (12) within a marginal area of the bulletproof glass window, to form a grading or stepped portion (14) from the projecting section to the other glass pane(s) in the direction of the inner side of the bulletproof glass window; the bulletproof glass window with the projecting section (12) of the at least one glass pane (1) is fixed to the frame (9), wherein the surface in the area of the grading or stepped portion (14) is fitted with an edging (10) made of synthetic material that holds back glass splinters.

11 Claims, 2 Drawing Sheets

BULLETPROOF GLASS WINDOW FOR USE AS A WINDSCREEN IN A MOTOR VEHICLE

FIELD OF THE INVENTION

The present invention relates to a bulletproof glass window or laminated safety glass window, in particular for use as a screen of glass at the front of a motor vehicle or windscreen of a motor vehicle or car which is mounted in a frame of the motor vehicle.

BACKGROUND OF THE INVENTION

In DE 195 39 607 A1 such a bulletproof glass window for a motor vehicle is described. The known bulletproof glass window is manufactured as a laminated glass pane made of several glass layers or glass panes, eight in all, with the circumferential edge of one of the glass panes jutting out beyond the other glass panes along the edge of the bulletproof glass window, thus forming a projection. Between the surfaces of the glass panes, which are identical in area, are connecting layers made of polycarbonate film that join the glass panes together. The bulletproof glass window is mounted in a window frame of the car body at the projection, i.e. the protruding section of the glass pane that juts out, the mounting being provided on the glass surfaces of the projection. In the direction of the interior of the motor vehicle, the known bulletproof glass window has a grading or stepped portion from the protruding section to the faces or front surfaces of the following glass panes. Practical tests, however, in particular crash tests, have shown that from the area of the protruding section glass splinters can be projected into the interior of the motor vehicle, creating a potential danger to passengers in the motor vehicle.

SUMMARY OF THE INVENTION

The object of the invention is, therefore, to provide a bulletproof glass window from whose protruding section glass splinters can no longer enter into the interior of the motor vehicle.

This problem is solved by the bulletproof glass window of the present invention. Accordingly, the bulletproof glass window of the invention or safety glass pane, which is mainly constructed to be used as the windscreen of a motor vehicle and which can be mounted into a frame, comprises several laminated glass panes, with at least one of the glass panes jutting out over the other glass panes with a protruding section within a marginal area of the bulletproof glass window, to form a grading or stepped portion from the protruding section to the other glass pane(s) in the direction of the inner side of the bulletproof glass window, e.g. towards the interior of the motor vehicle, the bulletproof glass window with the protruding section of at least one glass pane being mounted on the frame, and the surface in the area of the grading or stepped portion is provided with an edging made of a synthetic material to hold back glass splinters.

In the event of mechanical impact even in the marginal area or in the graded area of the bulletproof glass window, the edging, cover, layer or frame made of synthetic material to hold back glass splinters reliably prevents any glass splinters from penetrating the edging. This means that if the bulletproof glass window according to the invention is used as a windscreen, the glass splinters cannot penetrate through the synthetic material edging and thus enter the interior of the motor vehicle. This also means that passengers in the motor vehicle are protected from glass splinters even if the glass pane breaks or bursts in the marginal area. The present invention consequently has the considerable advantage of reliably protecting the passengers in the vehicle against injury through glass splinters that are projected into the interior.

The edging of the bulletproof glass window according to the invention is preferably fitted with a layer of synthetic material made of polycarbonate (PC) and/or a layer of synthetic material made of polyurethane (PU), polyvinylbutyral (PVB), ethylenevinylacetate (EVA) or polyethyleneterephthalate (PET).

The edging can be formed by a series of layers with several layers of synthetic material as laminates on part of the surface or on the entire surface of the grading and/or on the face of the projection. The laminated structure of the edging means that the connection between the edging and the glass is improved and that the edging is more durable.

The edging is preferably constructed as two layers, the layer that touches the surface of the grading being made of polyurethane which in turn bears a layer of polycarbonate. The polyurethane establishes a secure compound between the surface of the glass of the projecting section and the layer of polycarbonate or the polycarbonate film.

The edging preferably extends on that part of the surface of the grading which is parallel to the inside of the bulletproof glass window to avoid a complicated production and unnecessary production costs for the edging.

The face of the edging or protective layer can extend and thus stick out beyond the at least one projecting glass pane. This is particularly an advantage in cases where the seat in the car body frame is constructed in such a way that spaces remain in the frame where the bulletproof glass window is fitted and that, otherwise, splinters can enter into the interior of the vehicle through the spaces. These spaces can be closed off or blocked by means of the edging jutting out from the edge or the projection of the bulletproof glass window, so that no splinters penetrate into the inside of the motor vehicle in the event of, for example, an accident.

For this, the edging can have a protruding lip, stub or nose that in the area of the grading at least partially fringes the bulletproof glass window. The lip can be manufactured easily when during manufacture of, for instance, a series of even and flat layers of polyurethane and polycarbonate as edging is extended beyond the edge of the pane. The lip can be made to be flexible and/or elastic.

Further advantageous embodiments of the present invention are mentioned in the dependent claims. Further advantages, advantageous embodiments and possibilities of application of the present invention are provided in the following description of preferred embodiments in connection with the drawings wherein:

DESCRIPTION OF THE PREFERRED EMBODIMENTS

Figure 1:
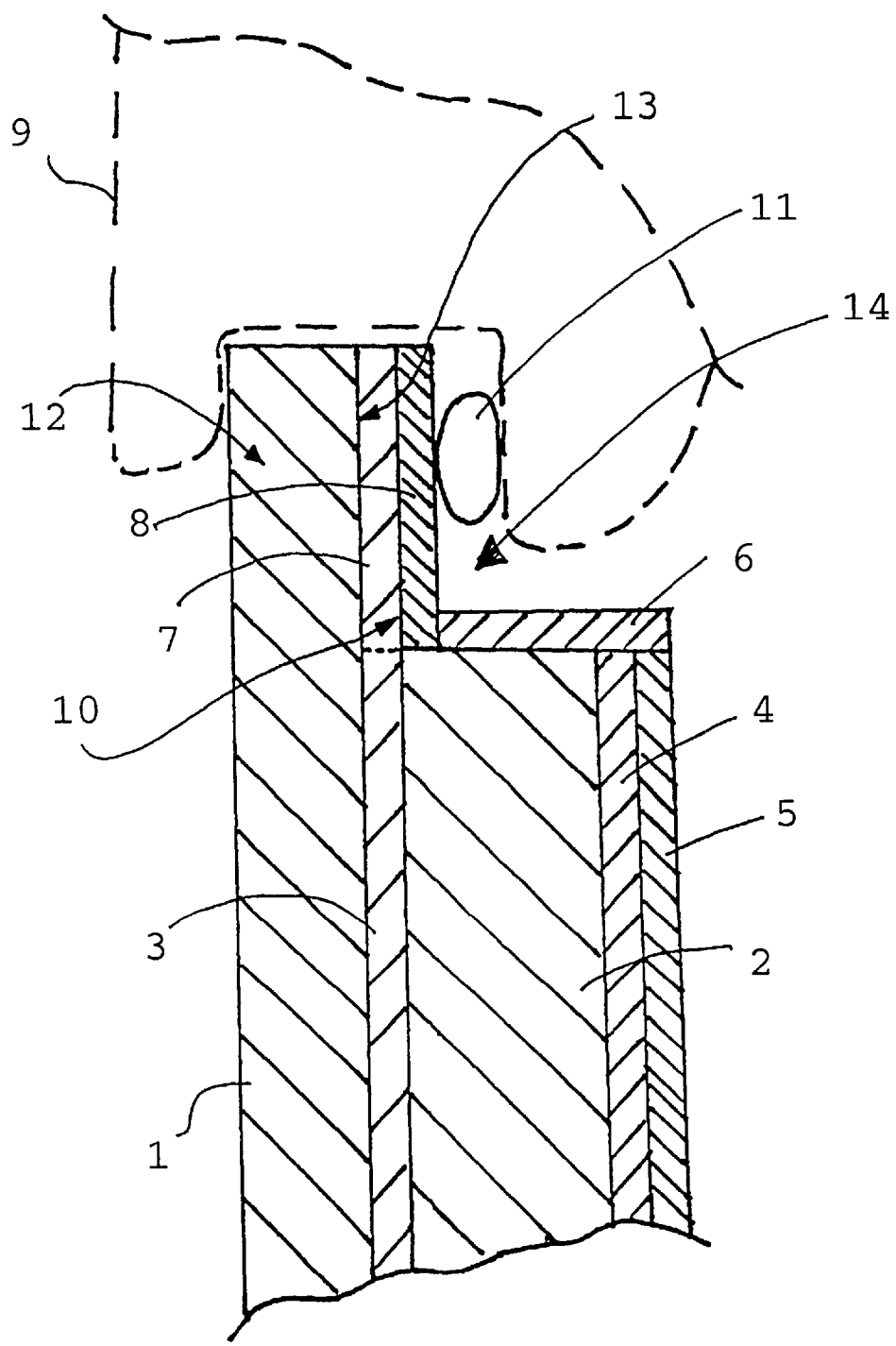
FIG. 1 shows a partial view as a cross section of a first embodiment of the bulletproof glass window according to the invention, the mounting of the bulletproof glass window in the frame is indicated.

FIG. 1 shows a first embodiment of the bulletproof glass window according to the invention that is constructed as a laminated glass pane and comprises several glass panes arranged in layers 1, 2, a laminate 3 or composite layer between the two glass panes 1, 2 and a series of layers as edging made of a layer of polyurethane 7 and a layer of polycarbonate 8 in a marginal area of the bulletproof glass window according to the invention. Below, the construction of the bulletproof glass window according to the invention, as shown in FIG. 1, is explained in detail by way of an example as a windscreen or screen of glass at the front of a motor vehicle. The shown embodiment of the bulletproof glass window can, however, e.g. be used as a rear window of a motor vehicle, as a safety glass pane in an aircraft or a ship etc.

Glass pane 1 on the outside, in relation to the interior of the motor vehicle, is connected with the glass pane 2 on the inside, in relation to the interior of the motor vehicle, by means of a laminate 3 made of polyurethane or polyurethane film or foil. In the marginal area, the outer glass pane 1 juts out over the inner glass pane 2 circumferentially along or at the entire bulletproof glass window, thus forming a protruding section 12 of the bulletproof glass window according to the invention. With this protruding section 12 or projection the bulletproof glass window is mounted in a frame 9 (in FIG. 1 indicated as a dotted line) of the car body, or it is fixed in place with an adhesive track 11, the frame 9 is formed by the A-columns, the roof cross-beam an the lower cross-beam and has a circumferential seat to accommodate the protruding section 12.

On the inner surface 13 of the protruding section 12 of the outer glass pane 1 within the circumferential grading 14, or the bordering groove, of the shown bulletproof glass window, a layer is formed of a layer of polyurethane 7 and a layer of polycarbonate 8 as an edging 10 or cover as protection against glass splinters and penetration of glass splinters into the interior of the motor vehicle, with the polyurethane layer 7 touching the inner glass surface 13 and bearing the polycarbonate layer 8. The polyurethane layers 3 and 7 form a continuous layer and are manufactured in one stage.

The inner glass pane 2 that is set back in relation to the outer glass pane 1 is fitted on the face with sealing layer 6 made of polyurethane. On the entire area of the inner surface of the glass pane 2, a series of layers with a polyurethane layer 4 and a polycarbonate layer 5 is applied, with the polyurethane layer 4 on the inner surface of the glass pane 2, while the polycarbonate layer 5 is formed on the polyurethane layer.

In the manufacture of the bulletproof glass window according to the invention that is shown in FIG. 1, the glass panes 1 and 2 are first of all washed and dried on a transport production line. Subsequently, a sandwich construction is manufactured in a dustfree and air conditioned room. During this process a polyurethane film that is 1 mm thick—from a typical range of foil thickness between approximately 0.3 mm and 5 mm —is manually, semiautomatically or fully automatically put on and aligned over the entire inner area of the surface 13 of the outer glass pane 1, in such a way that the applied polyurethane film covers the entire inner surface 13 of the glass pane 1, to form the polyurethane layers 3 and 7. Afterwards, the inner glass pane 2 is laid on the polyurethane layer 3 and aligned in such a way that in the marginal area of the bulletproof glass window to be produced, a uniform, circumferential grading or stepped portion 14 is formed, or the outer glass pane 1 juts out in the marginal area over the inner glass pane 2 with a projecting section 12. On the bare or exposed surface of the polyurethane film or the polyurethane layer 7, that runs circumferentially along the edge, a polycarbonate frame, that had either previously been cut out of polycarbonate film or punched out of it, is now laid in the grading 14 on the polyurethane layer 7, the width of the polycarbonate frame corresponding to the width of the exposed frame-like polyurethane layer 7, and this in turn being covered by the polycarbonate frame. The thickness of the layer of the polycarbonate frame or strip is, for instance, 1 mm. The thickness of the polycarbonate layer can, however, depending on the application, be chosen between approximately 0.5 mm and 5 mm.

From the thus prepared sandwich construction a pre-laminate is subsequently produced with partial plasticized films by heating and pressing in a so-called pre-laminate oven. In the course of preparatory treatment, the enclosed air is almost completely pressed out of the sandwich construction.

Afterwards the sandwich structure that has been pre-treated in this way is placed in an autoclave. In this autoclave, precisely defined pressure and temperature cycles are created and the single components of the pre-treated sandwich construction are bonded or connected together. During the autoclave cycle the interior of the autoclave is first heated to a temperature between 120° and 150° C., preferably 130° C., under pressure of 12 to 15 bar, preferably 14 bar. Once the set points or desired values for pressure and temperature have been reached, they are maintained over a holding time in the autoclave. Afterwards the temperature is first reduced in the autoclave and then the pressure.

In the next step, a polyurethane film, as polyurethane layer 4, is laid on and aligned over the now exposed surface of the inner glass pane 2, and onto this aligned polyurethane film a polycarbonate film as polycarbonate layer 5 is laid over the entire area, the series of layers comprising polyurethane and polycarbonate film covering completely the exposed inner surface of the inner glass pane 2. On the surface of the face of the inner glass pane 2 that is still bare, a circumferential strip of polyurethane is laid that forms the sealing layer 6.

The thus prepared sandwich construction is now heated and pressed again in a pre-laminate oven in order to press out almost completely air that is between the inner glass pane 2 and the series of layers comprising polyurethane and polycarbonate that has been applied to it, and to obtain a partial plasticization of the films from the series of layers.

The pre-laminated glass pane thus obtained is then treated again in an autoclave, the previously-explained pressure and temperature cycle being carried out again in order to obtain a durable and firm joining of the whole pre-laminated glass pane.

In the case of the bulletproof glass window manufactured in this way, the circumferential polycarbonate layer 8 in the marginal area of the bulletproof glass window prevents glass splinters from the edge of the glass pane getting into the interior of the motor vehicle in the event of an accident or crash test.

Methods for producing laminated glass panes or bullet-proof glass windows are basically explained e.g. in the DE 197 45 160 A1 under the title "Verfahren und Vorrichtung zur Herstellung von Verbundsicherheitsglas" (Method and apparatus of the manufacture of laminated glass), and in the unexamined laid-open patent application DE 197 114 59 A1 under the title "Verfahren zur Herstellung einer gebogenen Verbundsicherheitsglasscheibe" (Method of the manufacture of a curved laminated glass pane), these will also be referred to.

Figure 2:
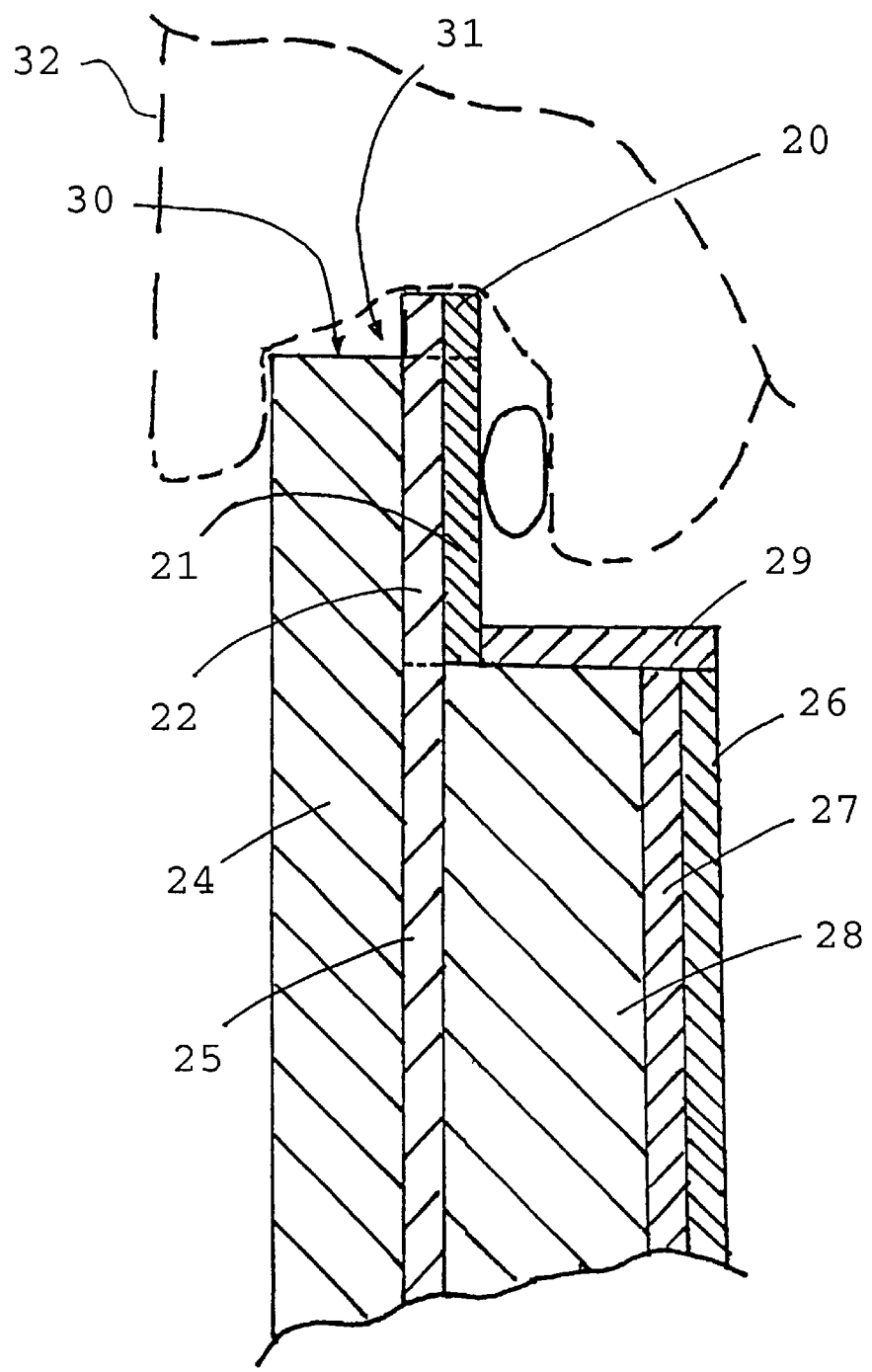
FIG. 2 shows a second embodiment of the bulletproof glass Window of the present invention.

FIG. 2 shows a second embodiment of the bulletproof glass window according to the invention. The bulletproof glass window shown, which can also be used as a windscreen for a motor vehicle, comprises the same series of layers as the previously-explained first embodiment, as shown in FIG. 1, namely an outer glass pane 24, a continuous polyurethane layer 25, an inner glass pane 28, a polyurethane layer 27 and a polycarbonate layer 26. The edging comprises here again a polyurethane layer 22 and a polycarbonate layer 21, with the polyurethane layers 22 and 25 being produced as one layer. A sealing layer 29 also exists in this example.

The essential difference to the first embodiment of FIG. 1 is that the series of layers with the polyurethane layer 22 and the polycarbonate layer 21, i.e. the edging, extends beyond the face 30 of the outer glass pane 24 to form a circumferential lip 20 along and at the edge of the bulletproof glass window. In the event of a crash, resulting glass splinters in a space 31 of the frame 32 (indicated in FIG. 2 by the dotted line) are reliably held back from the interior of the motor vehicle by the lip 20.

The process of manufacture follows the steps explained above concerning the first embodiment. During the individual stages, the lip 20, however, is held in the intended position by suitable supports and spacers.

In additional embodiments three and more glass panes can be joined together in a sandwich construction, instead of the two glass panes as in the first and second embodiments. It would be possible then that e.g. at least two inner glass panes set further back and/or several e.g. two outer glass panes of identical area are used that form the protruding section of the bulletproof glass window.

In a further embodiment of the invention an edging or layer which, for instance, may comprise a series of layers made of polyurethane and polycarbonate, can cover the inner surface of the protruding glass pane (refer to 13 in FIG. 1) and, additionally, also the face of the protruding glass pane (refer to 30 in FIG. 2) completely or partially. This covering or layer made of synthetic material on the face of the projection may also be used in combination with the lips of the embodiment of the invention shown in FIG. 2.

What is claimed is:

1. Bulletproof glass window, comprising a plurality of laminated glass panes (1, 2; 24, 28) in a composite structure, wherein
at least one glass pane (1; 24) juts out over the other glass pane(s) (2; 28) with a projecting section (12) in a marginal area of the bulletproof glass window, to form a stepped portion (14); and
an internal surface of the stepped portion (14) is provided with an edging (10) made of synthetic material for holding back glass splinters.

2. Bulletproof glass window according to claim 1, wherein the edging (10) comprises at least one layer of synthetic material.

3. Bulletproof glass window according to claim 2, wherein the edging (10) comprises a layer (8; 20) made of polycarbonate (PC).

4. Bulletproof glass window according to claim 2, wherein the edging (10) comprises a layer (7;22) made of polyurethane (PU), polyvinylbutyral (PVB), ethylenevinylacetate (EVA) or polyethyleneterephthalate (PET).

5. Bulletproof glass window according to claim 2, wherein the edging (10) is formed by a series of layers of synthetic material laminated on the surface of the stepped portion (14).

6. Bulletproof glass window according to claim 5, wherein the series of layers comprises two layers of synthetic material, an outer exposed layer (8; 21) thereof being made of polycarbonate.

7. Bulletproof glass window according to claim 5, wherein a layer (7; 22) contacting with the internal surface of the stepped portion (14) is made of polyurethane for bearing another layer (8; 21) of polycarbonate.

8. Bulletproof glass window according to claim 1, wherein the edging (10) extends onto an partial area (13) of the internal surface of the stepped portion, which extends parallel to an inner side of the bulletproof glass window.

9. Bulletproof glass window according to claim 1, wherein the edging extends beyond an edge of the at least one projecting glass pane (24).

10. Bulletproof glass window according to claim 9, wherein the edging has a protruding lip (20), which fringes at least a peripheral portion of the bulletproof glass window.

11. Bulletproof glass window according to claim 1, wherein the edging further extends to cover at least a side face of the stepped portion.

* * * * *